United States Patent [19]

Chu

[11] 4,268,726
[45] May 19, 1981

[54] MULTIPLE CANTILEVER SPRING CONTACT SWITCH

[75] Inventor: Pak-Jong Chu, Ottawa, Canada

[73] Assignee: Northern Telecom Limited, Montreal, Canada

[21] Appl. No.: 67,332

[22] Filed: Aug. 17, 1979

[51] Int. Cl.³ .................. H01H 3/04; H01H 9/02; H01H 21/80; H04M 1/08
[52] U.S. Cl. .................. 179/164; 200/1 A; 200/6 C; 200/283; 200/335
[58] Field of Search .................. 179/159, 164, 158 R; 200/6 BB, 6 C, 1 TK, 1 A, 61.58 R, 283, 335, 153 L, 153 LA, 153 LB

[56] References Cited

U.S. PATENT DOCUMENTS 2,072,264  3/1937  Ide .................. 179/158 R X
4,046,980  9/1977  Rosebrock .................. 179/164 X

FOREIGN PATENT DOCUMENTS

2726565  12/1977  Fed. Rep. of Germany ...... 179/164

Primary Examiner—Thomas W. Brown
Attorney, Agent, or Firm—Sidney T. Jelly

[57] ABSTRACT

A multiple cantilever spring contact switch has contact members stacked both vertically and side-by-side. The contact members are gripped at one end between surfaces which impose a predetermined inclination of the contact members relative to a base. A pivotally mounted lever on the contact assembly actuates the contact members and can also serve as a member which is actuated by a telephone handset. No specific spring is provided for the lever, the lever being biased by the spring contact members.

20 Claims, 20 Drawing Figures

MULTIPLE CANTILEVER SPRING CONTACT SWITCH

This invention relates to multiple cantilever spring contact switches and in particular relates to a telephone hook switch.

In many forms of cantilever spring contact switches, the spring contact members are stacked, that is assembled on top of one another, contacts being made and broken by flexing of one or more contact members relative to others. Conventional forms of such stacked contact members require accurate assembly to provide accurate positional relationship between contact members, to obtain the desired contact sequence.

In copending application entitled "Multiple Cantilever Spring Contact Switches" in the names of S. A. Croft, B. J. Dolan and P. J. Chu, Ser. No. 67,476, filed Aug. 17, 1979, the spring contact base surfaces which are inclined relative to each other so as to impose predetermined angular inclinations to the spring contact members. In a further copending application entitled "Multiple Cantilever Spring Contact Hook Switch" in the names of W. F. Wernet, W. J. Adams and S. W. Haskins Ser. No. 66,408, filed Aug. 14, 1979, a similar arrangement further member mounted on the spring contact assembly and interposed between the moveable or actuated ends of the spring contact members and the operating member, for example the member moved by placement and removal of the handset. The further member permits of misalignment between the operating member and the spring contact members, such as can occur when either the operating member of the spring contact assembly, or both, are mounted on printed circuit boards, or where other causes of misalignment may occur. If the actuating surface of the operating member is not in a plane parallel to the plane containing the ends of the spring contact members to be actuated by the operating member, then the contacts can be actuated in the wrong sequence, or some contact members not actuated at all. The further member ensures contact actuation of the contact members.

The present invention provides a multiple cantilever spring contact switch in which the spring contact members are both stacked vertically and also positioned side-by-side. In the particular example the spring contact members are gripped at one end with the contact members in vertical pairs, with pairs spaced side-by-side across the switch. The gripped ends are gripped between surfaces which impose a predetermined inclination of the contact members relative to a base surface. Generally the spring contact members of one or more pairs are parallel, while in one or more other pairs one contact member is inclined upwardly relative to the other contact member, the free end of the one member biased to contact the other contact member. A pivotally mounted lever mounted on the contact assembly actuates the contact and also serves as the member which is actuated by the hand set of a telephone. No specific spring is provided for the lever, the lever being biased by the spring contact members.

The invention will be readily understood by the following description of certain embodiments, by way of example, in conjunction with the accompanying drawings, in which:

FIGS. 4, 5 and 6 are plan view, cross-section on the line V—V of FIG. 4, and end view respectively of a spacer for positioning on the base as in FIGS. 1, 2 or 3;

In the embodiment illustrated in FIGS. 1 to 16, a switch comprises five sets of spring contacts divided into two groups in the manner of actuation. The contacts are mounted in an assembly of parts, the individual parts being described in detail with reference to the particular Figures and the complete assembly illustrated in FIGS. 13 to 16.

The various parts of a switch comprise a base, a spacer, a cover and an actuator now to be described in detail.

Figure 1:
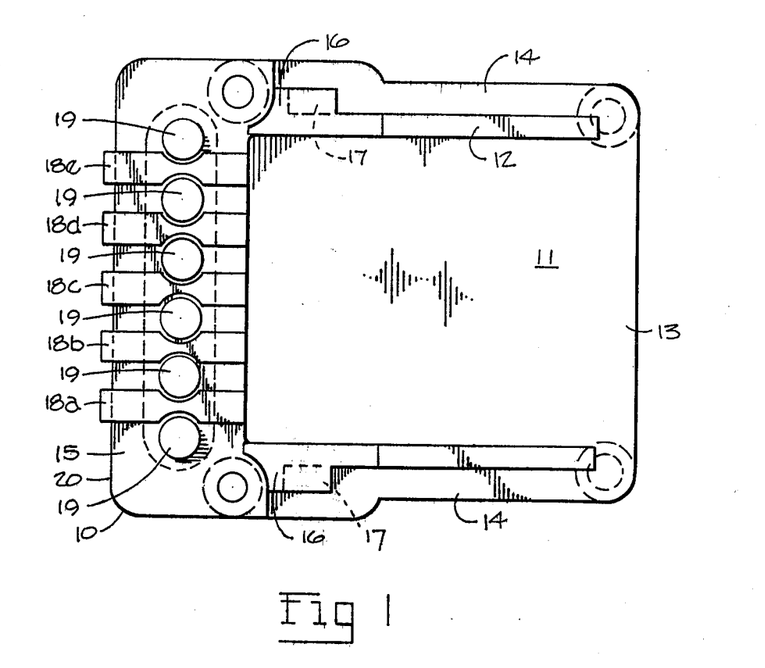
FIGS. 1, 2 and 3 are plan view, side view and end view respectively of the base of a switch assembly.
Figure 2:
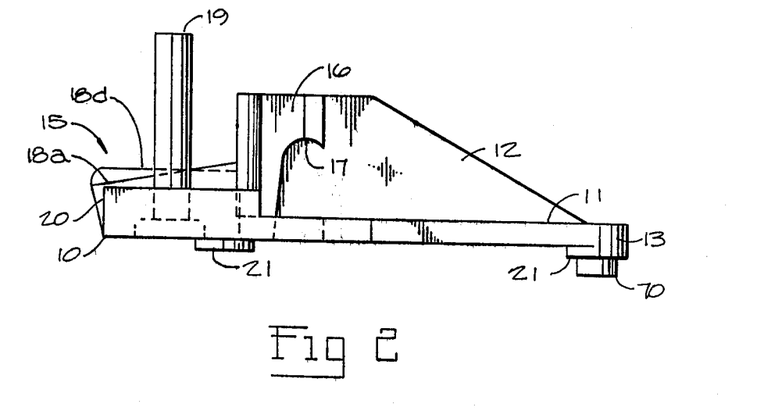
Figure 3:
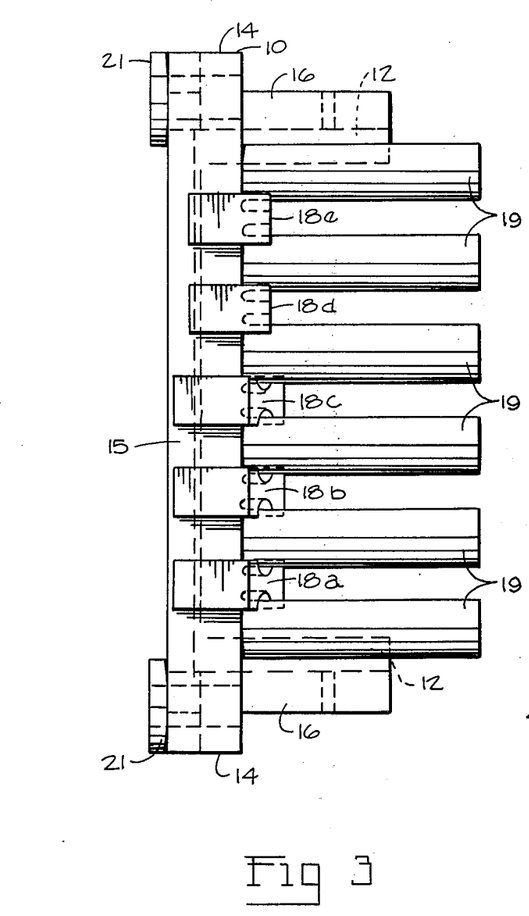

FIGS. 1, 2 and 3 illustrate a base 10 which comprise a flat central web 11 having inclined side members 12, extending rearwardly and upwardly from a position adjacent the front edge 13 of the web 11. The side members 12 are inset slightly from the side edges 14 of the web 11 and extend to a position at which a thickened rib 15 extends along the rear edge of the web. At the rear part of each side member 12 there is formed a lateral extension or thickening 16 which is undercut at 17 at the upper end to form a hook-shaped recess having an arcuate surface facing towards the top surface of the web 11.

The rib 15 extends across the rear of the web and has a plurality of surfaces 18a to 18e formed thereon. Between each pair of surfaces, and at each end beyond the surfaces, cylindrical projections 19 extend upwards. In the example illustrated three of the surfaces, 18a, 18b and 18c are inclined inwardly and upwardly from the rear edge 20, and two surfaces 18d and 18e are in a plane parallel to the web 11. The surfaces 18a to 18e are raised from the web 11. The under surface of the web may be provided with bosses 21 for locating and/or mounting the base on a support mmeber, for example a printed circuit board (PCB).

Figure 4:
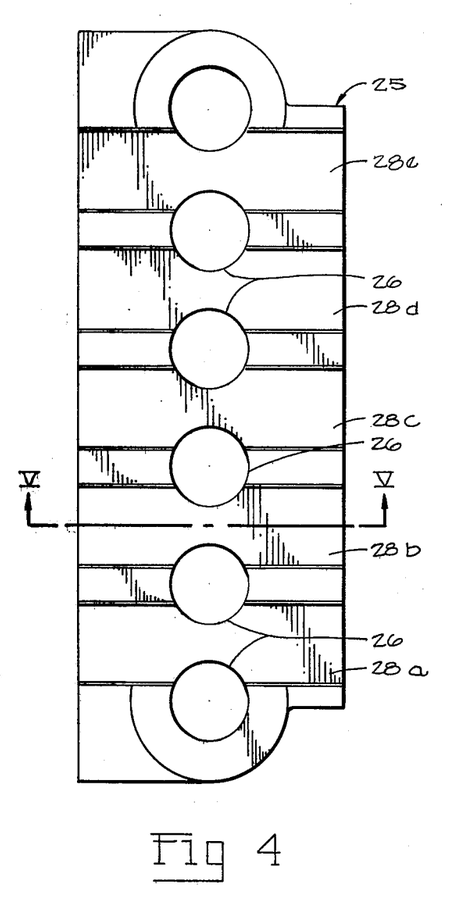
Figure 5:
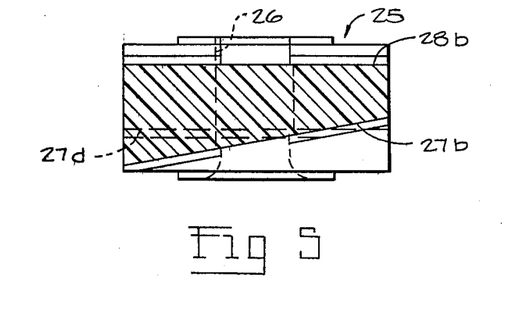

FIGS. 4, 5 and 6 illustrate a spacer, 25 for positioning over the projections 19 and locating onto the rib 15. The spacer is of elongate form and of generally rectangular cross-section. A plurality of bores 26 extend through the spacer, relatively positioned and dimensioned to be a sliding fit over the projections 19 of the base. A plurality of spaced flat surfaces are formed on the opposed sides of the spacer, surfaces 27a to 27e on what can be termed the bottom side and surfaces 28a to 28e on the top side. Surfaces 27a to 27e are positioned to cooperate with surfaces 18a to 18e respectively on the base to grip spring contacts therebetween. To this end, surfaces 27a, 27b and 27c are inclined to match the inclined surfaces 18a, 18b and 18c and surfaces 27d and 27e are parallel to the plane of the bottom side of the spacer. Surfaces 28a to 28e, in the present example are on the same plane and are parallel to the plane of the surfaces 27a, 27b and 27c. The surfaces 28a to 28e are aligned with surfaces 27a to 27e respectively. This can readily be seen from FIGS. 5 and 6.

Figure 7:
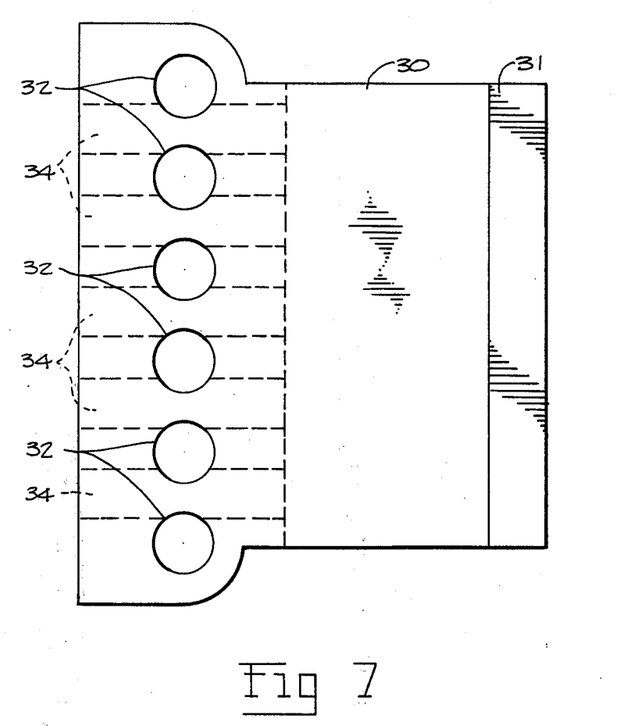
FIGS. 7, 8 and 9 are plan view, side view and end view respectively of a cover for positioning on the spacer in FIGS. 4, 5 and 6.
Figure 8:
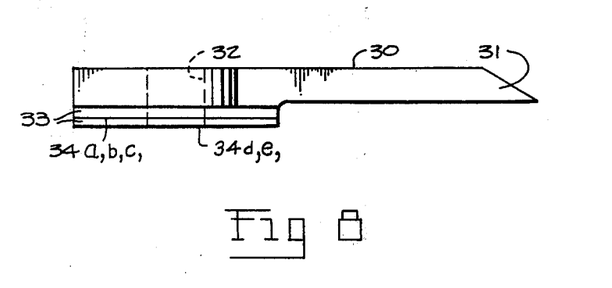
Figure 9:
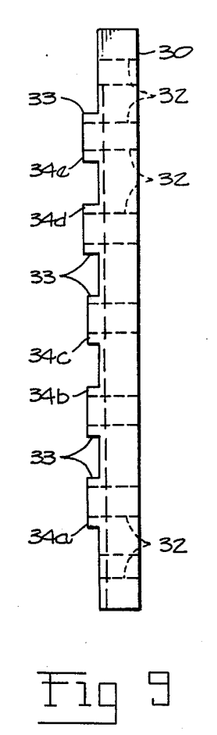

The cover 30 is illustrated in FIGS. 7, 8 and 9. It comprises a generally thin flat member having a tapered or chamfered front edge 31. At a rearward position there is provided a plurality of bores 32 positioned and dimensioned to be a sliding fit over the projections 19 of the base. Formed on the undersurface of the cover at a rearward portion of the cover are a plurality of shallow ribs or projections 33 each having a flat surface, 34a–34e, thereon. The ribs 33 align with the surfaces 28a to 28e on the spacer, with the surfaces 34a to 34e in cooperating opposition to the surfaces 28a to 28e therebetween.

Figure 10:
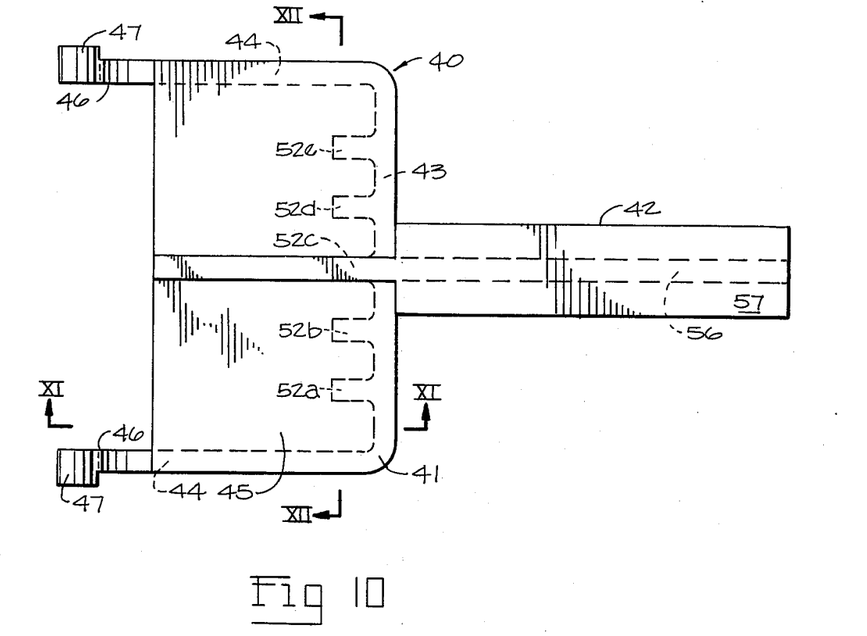
FIG. 10 is a plan view of one form of actuator or lever for pivotal mounting on the base as in FIGS. 1, 2 and 3.
Figure 11:
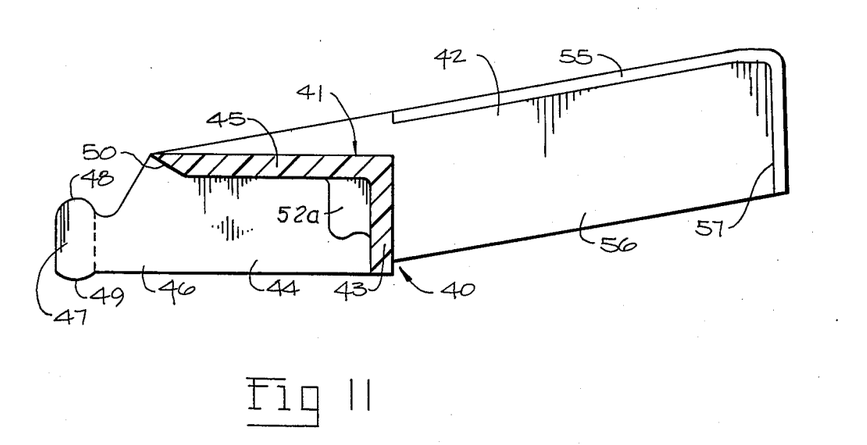
FIG. 11 is a cross-section on the line XI—XI of FIG. 10.
Figure 12:
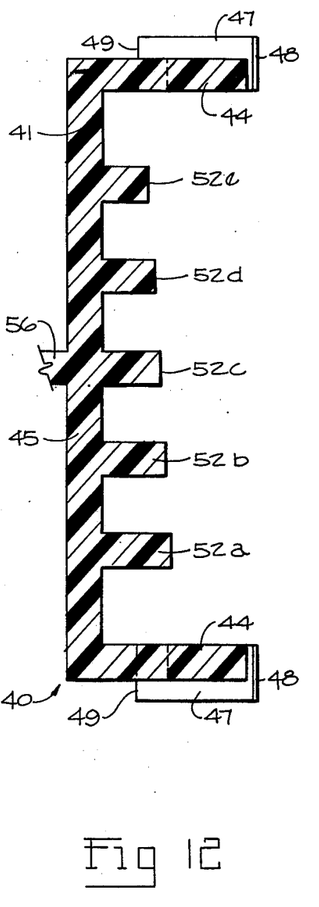
FIG. 12 is a cross-section on the line XII—XII of FIG. 10.

FIGS. 10, 11 and 12 illustrate the actuator 40. The actuator comprises a box-shaped portion 41 and a lever arm 42, projecting from the front 43 of the box portion 41. The portion 41 is open at the rear and has two spaced apart sides 44 which extend beyond the top 45 of the box portion. The ends 46 of the sides each has a rib 47 having a semicircular upper surface 48 and an arcuate lower surface 49. The box portion 41 is such that the sides 44 are spaced apart so as to lie on the outsides of the side members 12 of the base, with the semicircular upper surfaces 46 extending into the undercut 17 and the arcuate surface 47 resting on the upper surface of the web 11. This will be seen in FIG. 15, to be described later. The rear edge 50 of the top web of the box portion 41 is tapered or chamfered to match and cooperate with the tapered edge 31 of the cover 30. Positioned on the inside of the box portion 41, in the corner formed by the front 43 and the top 45 are a plurality of ribs 52a to 52e. The ribs are spaced laterally across the actuating member to be aligned with spring contacts gripped between the surfaces 18a to 18e, 27a to 27e, 28a to 28e and 34a to 34e. These ribs, as seen in FIG. 12, extend down for different distances, to give a predetermined sequence actuation to the various contacts.

The lever arm 42 is a T shaped cross-section with a top flange 55 and central flange 56. The top flange 55 also extends down the forward end of the lever arm, at 57. The lever arm is arranged to project through a slot in, for example, one of the recesses in which is positioned either the transmitter or receiver end of the telephone handset. Thus the lever arm is directly moved by removal and replacement of the handset, that is to an "off-hook" condition and to an "on-hook" condition. In conventional telephone sets the member moved by the handset is independently biased to the "off-hook" position by its own spring. In the present invention, the lever arm 42 does not have its own spring but is biased by the spring contacts themselves, as will be seen in FIGS. 14 and 15.

Figure 13:
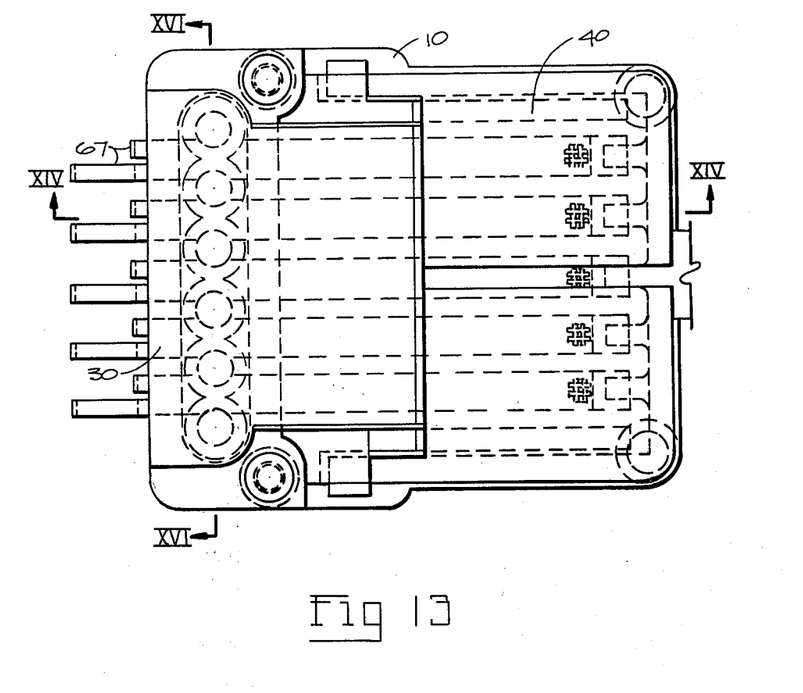
FIG. 13 is a plan view of an assembled switch.
Figures 14, 15:
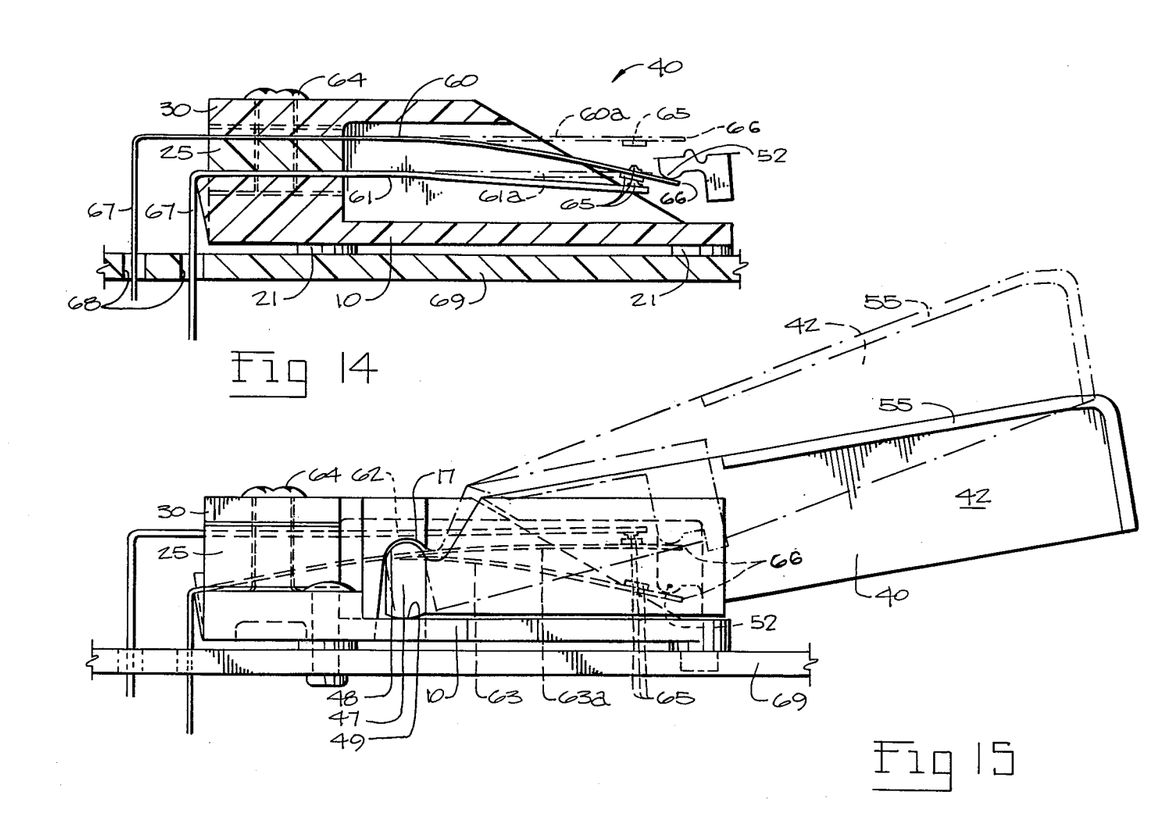
FIG. 14 is a cross-section on the line XIV—XIV of FIG. 13.
FIG. 15 is a side view of the assembled switch of FIG. 13.
Figure 16:
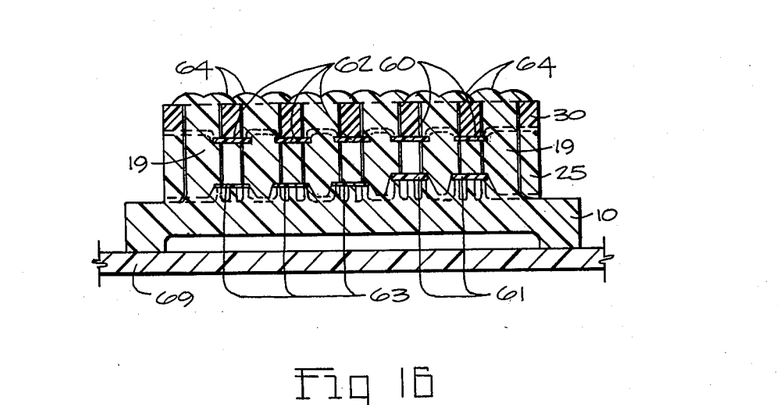
FIG. 16 is a cross-section on the line XVI—XVI of FIG. 13.
Figure 17:
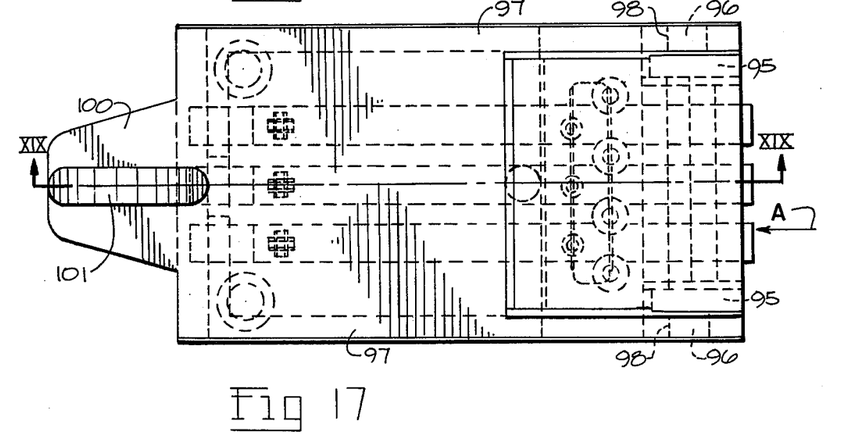
FIG. 17 is a plan view of an alternative form of switch.
Figures 18, 19:
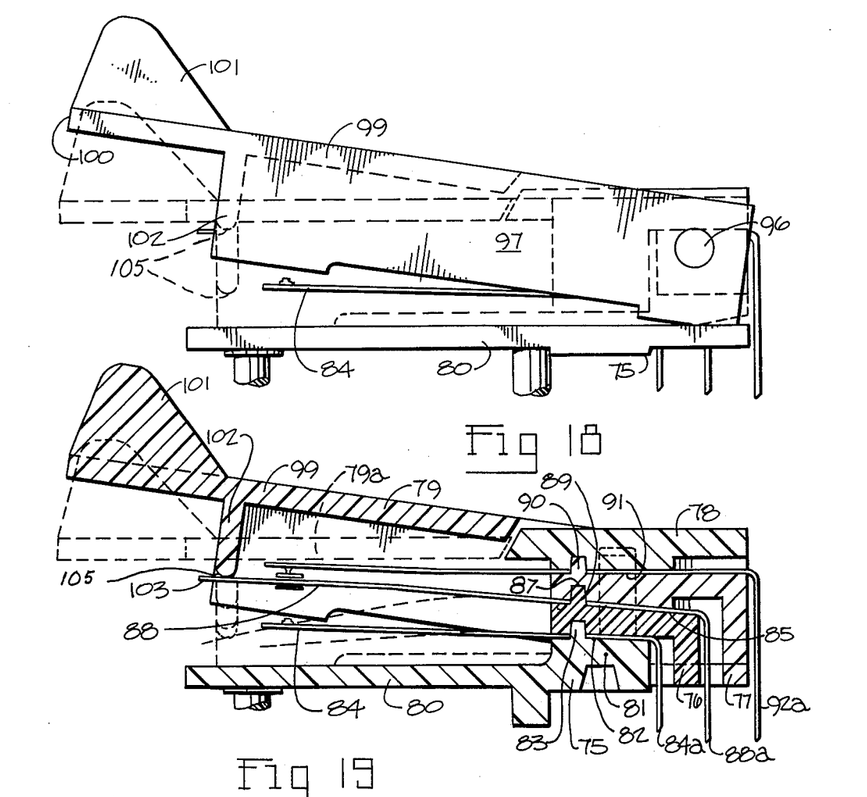
FIG. 18 is a side view of the switch of FIG. 17.
FIG. 19 is a cross-section on the line XIX—XIX of FIG. 17.

FIGS. 13 to 16 illustrate the assembled switch. FIG. 13, a plan view shows the six contact positions or sets, and in FIG. 14 is seen one pair of cantilever spring contact members 60 and 61. Also seen in FIG. 14 is the base 10, spacer 25, cover 30 and actuator or lever arm 40. The spring contact members are in two different series. A first series is as the contact members 60 and 61, and comprises two pairs of contact members, gripped between surfaces 18d and 18e of the base and 27d and 27e and 34d and 34e on the cover. These spring contact members are in a normally closed condition when the handset is in position, that is "on-hook", as shown in full outline in FIG. 14. When the handset is removed the contact members move to an open condition, as illustrated in chain dotted outline at 60a and 61a.

The other three pairs of spring contact members are as illustrated in dotted outline at 62 and 63 in FIG. 15. They are gripped between the surfaces 18a, 18b and 18c of the base and 27a, 27b and 27c of the spacer and between surfaces 28a, 28b and 28c of the spacer and 34a, and 34b and 34c of the cover. These pairs of contact members are normally in an open condition when the handset is in position, that is "on-hook". When the handset is removed the lower contact members 63 move up into contact with the upper contact members 62 as indicated in chain dotted outline at 63a.

Cover 30 and spacer 25, after assembly on to the projections 19 are retained in position, and gripping the ends of the spring contact members by "rivetting" over the tops of the projections, which extend through and beyond the cover. This is done by heating and pressing on the exposed ends as illustrated at 64 in FIGS. 14, 15 and 16. As is seen in FIGS. 14 and 15, and particularly in FIG. 16, the spring contact members which are acted upon by the actuator or lever arm 40 are slightly thinner than the other contact member of a pair. Thus contact members 60 are thinner than members 61 and contact members 63 are thinner than member 62.

The ends of the spring contact members at the free or contact ends have contacts 65 formed thereon. The ends of the contact members acted upon by the lever arm 40 extend slightly beyond the end of the other contact member of each pair, as seen at 66. The ends of the contact members remote from contacts 65 extend at 67 from the assembly, and in the embodiment illustrated are bent down to extend through holes 69 in a PCB 69. The base 10 is shown resting on the PCB and is attached, for example, by screws through the PCB into the bosses 21. Extensions 70 (FIG. 2), on the front bosses 21 can be provided for locating the switch assembly on the PCB. The spring contact members 61 and 63 act on the lever arm 40 to bias it to the upward position when the handset is removed without the use of a separate spring.

The cantilever spring contact switch assembly as illustrated in FIGS. 1 to 16 has spring contact members stacked in pairs and contact is either made or broken between pairs depending upon the initial assembly. It is also possible to provide a transfer switch assembly, in which contact is transferred from one contact member to another contact member by a third contact member. FIGS. 17, 18, 19 and 20 illustrate a transfer type of hook switch, having three sets of cantilever spring contact members. In the particular example illustrated there is a base 75, two spacers 76 and 77, a cover 78 and an actuator or lever arm 79.

The base 75 comprises a flat main body part 80 with a thickened rear portion or rib 81. Extending up from the top surface 82 of the rib 81 are three small bosses 83. The top surface 82 is inclined slightly upward and forward. On the surface 82 are positioned three lower cantilever spring contact members 84, each contact member having a perforation therein which fits over one of the bosses 83. Positioned over the contact members and on the rib 81 is the first spacer 76. The lower surface of the spacer is inclined to match the surface 82 of the rib 81 and the upper surface 85 of the first spacer is inclined forward and upward at a slightly steeper angle. Recesses 86 in the bottom of the first spacer fit over the bosses 83 of the base and a second series of bosses 87 extend upward from the surface 85. The bosses 87 are aligned vertically with bosses 83.

Intermediate cantilever spring contact members 88 are positioned on the surface 85, with perforations in the contact members fitting over the bosses 87. The second spacer 77 is positioned on the first spacer over the contact members 88. The lower surface of the second spacer is inclined to match the upper surface 85 of the first spacer and recesses 89 in the lower part of the second spacer fit over the bosses 87. A third series of bosses 90 extend upward from the top surface 91 of the second spacer, in vertical alignment with bosses 87 and 83.

Top cantilever spring contact members 92 are positioned on the surface 91 of the second spacer, perforations in the contact members fitting over the bosses 90. The top surface 91, in the present example, is parallel to the plane of the main body part 80. As a result of the relative inclinations of the surfaces 82 and 85, the intermediate contact members 88 are in contact at their free ends with the top contact members 92 and are spaced from the lower contact members 84.

Positioned on top of the top contact members 92 and on the second spacer 77 is the cover 78. Cover 78 extends across the top of the second spacer and has side members which extend down each side of the ends of the spacers. A series of projections 93 extend up from the top surface 82 of the rib 81, through holes in the two spacers 76 and 77 into recesses 94 in the cover. The cover is bonded onto the projections to form an assembly.

Figure 20:
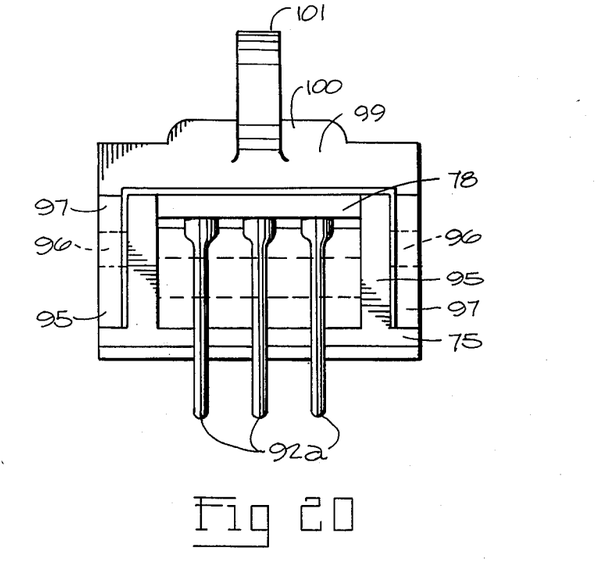
FIG. 20 is an end view of the switch of FIGS. 17, 18 and 19, in the direction of arrow A in FIG. 17.

The spacers 76 and 77 and the cover 78 extend laterally between side walls 95 which extend up from the base 75, as is seen in FIG. 20. The side walls are inset from the side edges of the main body member 80 of the base and projecting outwardly from each side wall is a pivot 96. The actuator or lever arm 79 is of channel shaped cross-section for a major part of its length and fits over the assembly of base, spacers and cover. Side webs 97 extend down each side and a bore 98 in each side web fits over the related pivot. The actuator 79 is attached by springing the side webs apart and snapping them over the pivots. The side members are not connected at their rear portions, a central web 99 only being provided for the front part. The web 99 extends forward from the channel shaped portion in the form of a tongue 100 of reduced width and tapered. Extending upward from the tongue 100 is a rib 101 which normally projects through the telephone set housing for actuation by the handset. At the forward end of the channel shaped portion a front wall 102 extends downwards and rests on an extension 103 of each intermediate contact member 88. Thus depression of the rib, as occurs on replacement of a handset, pivots the actuator 79, as indicated in dotted outline 79a, depressing the intermediate spring contact members 88, and breaking contact with contact members 92 and making contact with contact members 84. The rear ends 84a, 88a and 92a of the spring contact members are bent down for passing through a PCB or other mounting member and for attachment of conductors thereto. The lower edge 105 of the wall 102 can be straight, to actuate all the contact members 88 at the same time, or the lower edge can be stepped to provide a predetermined sequence of actuation. The switch assembly can be mounted on a PCB as in the example of FIGS. 1 to 16. As the actuator is mounted directly on the assembly, misalignment problems do not arise.

In both embodiments described, it is possible to remove the actuator or lever arm and replace by another actuator giving different operating characteristics.

What is claimed is:

1. A multiple cantilever spring contact switch, comprising:
    a base, at least one spacer, and a cover, in superposed relationship;
    said base comprising a flat central web, a rib extending upwardly along a rear edge of said web, and a plurality of clamping surfaces on said rib;
    clamping surfaces on opposite sides of said spacer;
    clamping surfaces on an underside of said cover;
    the clamping surfaces on said rib and the clamping surfaces on one side of said spacer forming a first series of pairs of opposed clamping surfaces;
    the clamping surfaces on the underside of said cover and the clamping surfaces on the other side of said spacer forming a second series of pairs of opposed clamping surfaces;
    the pairs of clamping surfaces having relative predetermined inclinations;
    a cantilever spring contact member clamped at one end between each pair of clamping surfaces to form at least two sets of spring contact members, the contact members in each set in stacked relationship and the contact members of a set having a predetermined inclined relationship, a contact member in each set having an extended free end;
    said base, at least one spacer, cover and cantilever spring contact members forming a switch assembly;
    an actuating member pivotally mounted on said switch assembly and including means for engaging said extended free ends of contact members, whereby on pivoting of said actuating member each contact member having said extended free end is deflected;
    and means for connecting an electrical conductor to each spring contact member.

2. A spring contact switch as claimed in claim 1, including two spacers in superposed position and clamping surfaces on opposite sides of both spacers, the clamping surfaces on the opposed sides of the spacers forming a further series of pairs of clamping surfaces having relative predetermined inclinations, and a cantilever spring contact member clamped at one end between each pair of said further series of pairs of clamping surfaces.

3. A spring contact switch as claimed in claim 2, said spring contact members in a set being in a vertically stacked alignment.

4. A switch as claimed in claim 2, having three contact members in superposed position to form one of said sets of contact members, a top contact member, a bottom contact member and an intermediate contact member, said intermediate contact member having said extended free end, said predetermined inclined relationship of a set of contact members including said intermediate contact member biased into contact with said top contact member and out of contact with said bottom contact member, pivoting of said actuator deflecting said intermediate contact member to break contact with said top member and make contact with said bottom contact member.

5. A switch as claimed in claim 4, including at least two of said sets of contact members side-by-side, said actuating member arranged to deflect said intermediate contact members in a predetermined sequence to provide a predetermined sequence of break and make contacts.

6. A switch as claimed in claim 5, at least one of said contact members having an extended free end acting on said actuating member to pivot said actuating member to a non-actuated position.

7. A switch as claimed in claim 1, for a hook switch for a telephone set, said actuating member including a member for extending through a housing of the telephone set for pivotting of the actuator by removal and replacement of a hand-set of the telephone set.

8. A switch as claimed in claim 1, including side walls extending up from said base, said actuator including side webs extending downward outside said side walls of said base, and pivotal means on said side walls and said side webs for pivotal mounting of said actuator.

9. A multiple cantilever spring contact switch, comprising:
a base having front and rear edges, a rib extending along the rear edge and a plurality of clamping surfaces on a top surface of the rib;
a spacer positioned on said rib and having a first plurality of clamping surfaces on a bottom surface thereof, in opposition to the clamping surfaces on said rib to form a plurality of first pairs of clamping surfaces;
a cantilever spring contact member clamped at one end between each first pair of clamping surfaces;
a second plurality of clamping surfaces on a top surface of said spacer;
a cover positioned on said spacer and having clamping surfaces on a bottom surface in opposition to the clamping surfaces on the top surface of said spacer to form a plurality of second pairs of clamping surfaces;
a cantilever spring contact member clamped at one end between each spaced pair of clamping surfaces;
all of said contact members extending forward over said base and forming at least two series of stacked contact members;
the clamping surfaces clamping one contact member of a series of stacked contact members inclined relative to the clamping surfaces clamping another contact member of a series, whereby said contact members have a predetermined inclination relative to each other and one contact of each series having its free end extended;
the base, spacer and cover forming, with said contact members, a switch assembly;
an actuator pivotally mounted on the switch assembly and including means for engaging with said extended free ends of the contact members, whereby on pivoting of said actuator each contact having said extended end is deflected; and
means for connecting an electrical conductor to each cantilever spring contact member.

10. A switch as claimed in claim 9, said base including side members extending upwardly from a top surface, a recess formed in a rear part of each side member, each recess having an arcuate surface facing towards the top surface of the base, said actuator including lateral extensions positioned in said recesses for pivotal movement therein.

11. A switch as claimed in claim 10, said side members inset from side edges of said base, said actuator positioned between said side members and said recesses formed in said side members on inner sides thereof, said lateral extensions on said actuator extending outwardly into said recesses, said extensions each including an arcuate upper surface in pivotal engagement with said arcuate surface in the related recess and an arcuate lower surface in contact with the upper surface of said base.

12. A switch as claimed in claim 9, for a hook switch for a telephone, said actuator including a lever arm for projection through a housing of the telephone set for pivotting by removal and replacement of a hand set of the telephone.

13. A switch as claimed in claim 9, at least one set of contact members having a predetermined relative inclination whereby said contact members are biased to a normally open condition.

14. A switch as claimed in claim 9, at least one set of contact members having a predetermined relative inclination whereby said contact members are biased to a normally closed condition.

15. A switch as claimed in claim 9, including at least one set of contact members having a predetermined relative inclination whereby said contact members of said set are biased to a normally closed condition and at least one other set of contact members have a predetermined relative inclination where said contact members of said other set are biased to a normally open condition, pivotting of said actuator reversing the conditions of said sets of contacts.

16. A switch as claimed in claim 15, said means on said actuator for engaging with said extended free ends of contact members having engaging surfaces positioned at different levels for a predetermined sequential actuation of said contacts.

17. A switch as claimed in claim 9, including a plurality of projections extending upward from said rib on said base, said clamping surfaces on said rib extending between said projections, and bores through said spacer and said cover, whereby said spacer and said cover are assembled to said base with said bores positioned over said projections.

18. A switch as claimed in claim 16, said means on said actuator for engaging with said extended free ends comprising a plurality of ribs extending down from an under surface of said actuator, said ribs extending for different lengths whereby said predetermined sequential actuation is provided.

19. A switch as claimed in claim 9, wherein said means for connecting an electrical conductor to each spring contact members comprises an extension on each contact member extending from the clamped end.

20. A switch as claimed in claim 9, at least one contact member having an extended free end acting on said actuating member to pivot said actuating member to a non-actuated position.

* * * * *